(12) United States Patent
Vacquier et al.

(10) Patent No.: US 11,962,037 B2
(45) Date of Patent: Apr. 16, 2024

(54) HYBRID PROTON EXCHANGE MEMBRANE

(71) Applicants: SYMBIO, Fontaine (FR); COLLEGE DE FRANCE, Paris (FR); Sorbonne Université, Paris (FR); Centre national de la recherche scientifique, Paris (FR)

(72) Inventors: Christophe Vacquier, Lyons (FR); Nathalia Rovira, Montbeliard (FR); Christophe Baverel, Audincourt (FR); Christel Laberty-Robert, Paris (FR); Laura Coustan, Bordeaux (FR); Clément Sanchez, Bures sur Yvette (FR)

(73) Assignees: SYMBIO, Fontaine (FR); COLLEGE DE FRANCE, Paris (FR); SORBONNE UNIVERSITÉ, Paris (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 221 days.

(21) Appl. No.: 17/154,771

(22) Filed: Jan. 21, 2021

(65) Prior Publication Data
US 2021/0234238 A1 Jul. 29, 2021

(30) Foreign Application Priority Data
Jan. 23, 2020 (FR) ...................... 20 00656

(51) Int. Cl.
*H01M 50/497* (2021.01)
*H01M 50/403* (2021.01)
(Continued)

(52) U.S. Cl.
CPC ....... *H01M 50/497* (2021.01); *H01M 50/403* (2021.01); *H01M 50/426* (2021.01); *H01M 50/449* (2021.01)

(58) Field of Classification Search
CPC ............. H01M 50/497; H01M 50/403; H01M 50/426; H01M 50/449
See application file for complete search history.

(56) References Cited

U.S. PATENT DOCUMENTS

2006/0257715 A1* 11/2006 Ueda .................... H01M 4/8605
429/492
2007/0213494 A1 9/2007 Mal et al.
(Continued)

FOREIGN PATENT DOCUMENTS

CA 2 950 775 2/2017
FR 2 888 048 1/2007
(Continued)

OTHER PUBLICATIONS

JP2005026005A—Machine Translation (Year: 2005).*
(Continued)

*Primary Examiner* — Brian R Ohara
*Assistant Examiner* — Patrick Marshall Greene
(74) *Attorney, Agent, or Firm* — Aaron Schulman, Esq.; Stites & Harbison, PLLC

(57) ABSTRACT

The present application relates to a proton exchange membrane for fuel cell, said membrane having self-regenerating properties, to cells comprising said membranes, and to the manufacturing method thereof via electrospinning.

14 Claims, 8 Drawing Sheets

(51) Int. Cl.
*H01M 50/426* (2021.01)
*H01M 50/449* (2021.01)

(56) References Cited

U.S. PATENT DOCUMENTS

2013/0164653 A1* 6/2013 Gonon .................. B01D 69/141
524/262
2014/0023952 A1* 1/2014 Yim .................... H01M 4/8668
429/535

FOREIGN PATENT DOCUMENTS

JP 2005026005 A * 1/2005
JP 2007 172871 7/2007

OTHER PUBLICATIONS

Preliminary Search Report for FR 20 00656 dated Sep. 11, 2020.
Written Opinion for FR 20 00656 dated Sep. 11, 2020.
Ren, et al: "Organic silica/Nafion® composite membrane for direct methanol fuel cells", Oct. 5, 2006, pp. 450-455, Journal of Membrane Science, Elsevier BV, NL, vol. 282, No. 1-2, XP024931839.

* cited by examiner

TEOS:CSPTC (1:2)   TEOS:CSPTC:MPTMS (1:2:1)

HYBRID PROTON EXCHANGE MEMBRANE

The present invention concerns the field of fuel cells and in particular the field of proton exchange membranes used in these cells.

Proton exchange membranes (PEMs) are semi-permeable membranes allowing proton conduction whilst remaining impermeable to gases such as dioxygen or dihydrogen: protons are able to pass through the membrane whereas gas permeation is prevented. PEMs are generally produced from pure polymer membranes or polymer-based composite membranes.

Fuel cell membranes containing a sulfonated copolymer of tetrafluoroethylene and a perfluoro(alkylvinylether) are also known. For example, one of the materials the most widely used by manufacturers of proton exchange membranes is Nafion®, a sulfonated fluorinated copolymer produced by DuPont.

CA2950775 describes electrospun fibre webs to reinforce fuel cell membranes.

US 2007/0213494 describes a (hybrid) silica organo-mineral polymer and use thereof as proton exchange material.

However, fuel cell operation causes membrane degradation on account of very high or very low temperatures and high relative humidity (close to 90%), as well as the formation of hydrogen peroxide ($H_2O_2$) which deteriorates the materials.

There is therefore a need to provide improved membranes that better withstand these operating stresses and have a longer lifetime.

The invention therefore proposes a membrane of hybrid material containing organic and inorganic components, said membrane in particular being capable of reacting with hydrogen peroxide to maintain good mechanical and conducting properties.

A first subject of the invention concerns a proton exchange membrane for fuel cell, said membrane comprising an anode surface on the anode side and a cathode surface on the cathode side, said membrane comprising two layers:

A conducting and self-regenerating cathodic layer ensuring the cathode surface and comprising at least one polymer (iii) carrying $SO_3H$ functions; and A conducting anodic layer ensuring the anode surface and comprising at least one polymer (iii') carrying $SO_3H$ functions;

Said polymers (iii) and (iii') possibly being the same or different;

Said membrane being characterized in that said cathodic layer contains at least one polymer (i) carrying thiol (—SH) functions.

In the invention, the membrane contains cathodic SH functions i.e. contained in the cathodic layer of the membrane.

These SH functions can also be contained in the catalytic cathodic layer of the fuel cell.

Therefore, a cell comprising a membrane of the invention advantageously comprises a zone functionalized with SH functions extending from the cathodic layer of the membrane to the catalytic cathodic layer on the surface thereof.

In one embodiment, the —SH functions can be distributed homogenously within the cathodic layer, and optionally within the catalytic cathodic layer.

Alternatively, they can be distributed in a concentration gradient of —SH functions increasing towards the cathode surface. This gradient illustrates the increasing concentration of SH functions from the inner surface of the cathodic layer with said anodic layer towards its outer surface ensuring the interface with the catalytic cathodic layer.

By inner surface of the membrane, it is meant the interface between the cathodic layer and the anodic layer.

By outer surfaces of the membrane, it is meant the cathode and anode surfaces thereof, ensuring the interfaces with the catalytic cathodic layer and the catalytic anodic layer respectively.

The proton exchange membranes of the invention are self-regenerating in that they use the harmful hydrogen peroxide produced during cell operation and which degrades membranes. The SH functions contained in the cathodic layer (and optionally in the catalytic cathodic layer) react with and consume the hydrogen peroxide thereby preventing harmful accumulation thereof. In addition, this reaction produces $SO_3H$ functions which preserve, and even regenerate and increase conducting properties.

The membranes of the invention therefore allow a considerable increase in the performance and lifetime of fuel cells.

In one embodiment, the layers are formed for example of hybrid fibres obtained by electrospinning.

In one embodiment, the membranes of the invention are said to be hybrid in that they contain an organic component and an inorganic component (also called mineral herein).

The organic constituents generally ensure the conducting properties, whilst the inorganic constituents ensure the matrix.

Typically, the matrix is a silicate mineral matrix of Nafion® type, or of sulfonated polyethers. In one embodiment therefore, the cathodic layer and/or said anodic layer comprise(s) an inorganic polymer (ii) and/or (ii'), respectively; said polymers (ii) and (ii') can be the same or different. Preferably the polymers (ii) and (ii') are silicon derivatives.

The membranes of the invention therefore combine the capacity to mimic the structural phase separation observed with Nafion® membranes, with oriented ionic nanochannels in which the protons are easily able to diffuse.

Additionally, the composition of the membrane has a favourable hydrophilicity/hydrophobicity ratio which improves proton diffusion and the wetting properties of the membrane.

The morphology and composition of the membrane impart good mechanical properties over a wide range of temperatures possibly ranging between negative temperatures and about 120° C.

In one embodiment, the membranes of the invention are composed of a mixture of:
  organic polymers selected from among polymers (i) carrying SH functions and/or (iii) and (iii') carrying $SO_3H$ functions; and
  inorganic polymers (ii) and (ii') derived from silicon.

The silicon-derived polymers form a random, three-dimensional, continuous, porous matrix within which organic constituents are inserted.

Regarding the cathodic layer, the organic polymers are composed in particular of polymers (i) carrying SH functions and polymers (iii) carrying $SO_3H$ functions.

Within said cathodic layer, the ratio of the concentration of $SO_3H$ functions to the concentration of SH functions is generally between 0.5 and 4, preferably between 1 and 4.

Regarding the anodic layer, the organic polymers are composed in particular of polymers (iii') carrying $SO_3H$ functions.

Regarding the cathodic layer and anodic layer, the inorganic polymers are composed in particular of polymers (ii) and (ii'), respectively, derived from silicon.

In one embodiment:
in the cathodic layer, the polymers (ii), (iii) and (i) are contained in a ratio of 1:2:1; and
in the anodic layer, the polymers (ii') and (iii') are in a ratio of 1:2.

As polymer (i) carrying thiol (—SH) functions, particular mention can be made of (3-mercaptopropyl)trimethoxysilane (MPTMS) of formula:

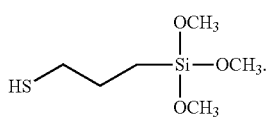

As polymer (ii) and/or (ii'), derivatives of silicon can be cited such as tetraethyl orthosilicate (TEOS) or tetramethyl orthosilicate (TMOS), of formula:

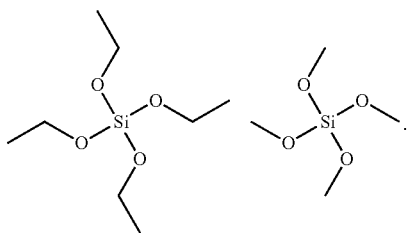

The inorganic polymer (ii) and/or (ii') can also be a derivative of Nafion® type, or of sulfonated polyethers.

The inorganic polymer ensures the backbone of the membrane.

As polymer carrying $SO_3H$ functions (iii) and/or (iii'), particular mention can be made of CSPTC (2-(4-Chlorosulfonylphenyl)ethyltrichlorosilane) of formula:

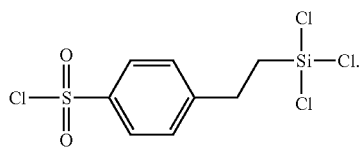

In one alternative embodiment to the mixture of polymers discussed above, the organic and inorganic constituents are co-condensed: the silicon polymers form a network onto which the organic polymers are grafted.

In this embodiment, the polymers (i), (ii) and (iii), and the polymers (ii') and (iii') are co-polymerized to form organomineral copolymers i.e. copolymers comprising both an organic component and a mineral component.

Therefore, the silica derivatives can be functionalized with SH and/or $SO_3H$, functions accordingly for the cathodic or anodic layer.

The polymers (i), (ii), (ii'), (iii), (iii'), the same or different, can then be selected from among silicon-derived (co)polymers carrying SH functions and/or $SO_3H$, functions respectively.

In either one of the above-cited embodiments, the polymers in mixtures or co-polymerized comprise both a mineral component (polymer (ii) or (ii') derived from silicon) to provide the matrix with rigidity, and an organic component (polymers (i), (iii) or (iii')) having SH and/or $SO_3H$ functions providing mobile protons (optionally after hydrolysis of the SH functions in the case of polymers (i)).

Typically, the anodic layer and the cathodic layer may further comprise one or more non-conductive (co)polymers to ensure the mechanical properties of the membrane. These polymers are known and are generally used for this purpose in membranes. As non-conductive polymers, mention can therefore made of poly(vinylidene fluoride) (PVDF), poly (co-hexafluoropropylene) (HFP), the mixtures thereof and/or the copolymers thereof poly(vinylidene fluoride-co-hexafluoropropylene (PVDF-HFP), meeting formula:

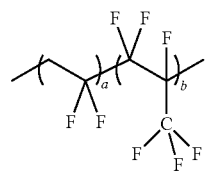

The cathodic and anodic layers of the membranes of the invention may further comprise one or more organic or inorganic additives, the same or different according to layer.

The additives conventionally used in proton conducting membranes can also be envisaged here. As additive, particular mention can be made of PEG (polyethylene glycol) and OFP (2,2,3,3,4,4,5,5-Octafluoro-1-pentanol), of respective formulas:

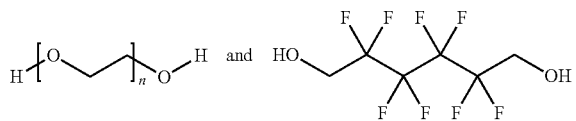

PEG improves the conductivity and mobility of PVDF-HFP chains, whilst OFP improves the affinity between PVDF-HFP (by means of its carbon chain carrying fluorine atoms) and the inorganic components (through the presence of hydroxyl functions).

The total thickness of the membrane of the invention is generally between 5 and 150 μm, typically between 15 and 40 μm.

In one embodiment, the cathodic layer is thinner than the anodic layer. Typically, said cathodic layer has a thickness of between 5 and 10 μm.

In one embodiment, the anodic layer and/or cathodic layer are composed of polymeric fibres of the aforementioned polymers in a mixture or co-polymerized.

These fibres are randomly intermeshed to create a porous three-dimensional network.

Typically, these fibres have a mean diameter of between 100 nm and 10 μm. This diameter can be adapted in particular as a function of the diameter of the nozzle of the electrospinning apparatus used at the time of their manufacture.

A further subject of the invention concerns a fuel cell comprising a bilayer membrane of the invention.

In said cell, the membrane of the invention is coated with a catalytic cathodic layer on the outer surface of the cathodic layer and with a catalytic anodic layer on the outer surface of the anodic layer.

In one embodiment, the catalytic cathodic layer comprises the polymers (i) and (iii), and the catalytic anodic layer comprises the polymer (iii'), said polymers (i), (iii) and (iii') being such as afore-defined.

A schematic illustration showing a structure of a cell of the invention is given in FIG. 2.

Such as illustrated in FIG. 2:

A fuel cell composed of an anode (5') and a cathode (5) is separated by a proton exchange membrane (3), said membrane (3) comprising a cathodic layer (1) on the cathode side, and an anodic layer (2) on the anode side.

The cathodic layer (1) has a thickness e1 of typically 3 to 15 µm, in particular 5 to 10 µm, preferably between 5 and 7 µm. The anodic layer (2) has a thickness e2, of typically 5 to 40 µm, in particular 10 to 30 µm, preferably between 10 and 20 µm.

On the outer surface, on the cathode side of the membrane (3), the cathodic layer (2) is coated with a catalytic cathodic layer (4).

On the outer surface, on the anode side of the membrane (3), the anodic layer (2) is coated with an anodic catalytic layer (4').

The cathodic (4) and anodic (4') catalytic layers comprise proton conductors (ionomers) (11) and (21) respectively, within which catalytic particles (12) and (22) are respectively distributed. As is conventional, these catalytic particles are composed of carbon-supported platinum particles (Pt).

The cathodic layer (1) particularly comprises SH functions and $SO_3H$ functions. These functions SH and $SO_3H$ are also contained in the catalytic cathodic layer (4), thereby defining a zone (1') functionalized with SH functions composed of the cathodic layer (1) and catalytic cathodic layer (4).

The anodic layer (2) particularly comprises $SO_3H$ functions which are also contained in the catalytic anodic layer (4').

A further subject of the invention concerns a method for preparing a membrane of the invention, said method comprising:

The formation of fibres composing said cathodic layer, from a solution comprising at least one polymer (i) carrying thiol (—SH) functions and at least one polymer (iii) carrying $SO_3H$ functions, via electrospinning;

The formation of fibres composing said anodic layer, from a solution comprising at least one polymer (iii') carrying $SO_3H$ functions, via electrospinning;

Forming the anodic layer and cathodic layer respectively from the fibres obtained;

Applying said cathodic layer onto said anodic layer.

In one embodiment, said solutions are sol-gel solutions.

The method of the invention combines sol-gel chemistry with electrospinning technology, and allows membranes to be obtained having proton conductivity similar to that of Nafion®, membranes, at high temperature and under 90% relative humidity, with anisotropic mechanical properties.

The morphology of the electrospun membranes of the invention can be modulated as function of sol-gel synthesis (e.g. with or without additives), and/or of the parameters of the electrospinning step such as relative humidity, applied electric field, temperature, electrode rotation rate . . . .

Electrospinning or spinning via electrostatic route is a method for producing fibres which uses electric force to draw charged polymer threads. The technique is based on applying a sufficiently high voltage to a polymer droplet in liquid form (solution or melt): the liquid body is charged and the force of electrostatic repulsion opposes surface tension forcing the droplet to stretch to a critical point (point of eruption or <<Taylor cone>>) at which a stream of liquid erupts from the surface. If the molecular cohesion of the liquid is sufficiently high, there is no stream break-up and a charged jet of liquid is formed. The jet is then elongated via a process caused by electrostatic repulsion, until it is finally deposited on the grounded collector. The elongation and thinning of the fibre lead to the formation of <<electrospun>> fibres that are uniform and of nanometric diameter.

The sol-gel process entails preparing oxide networks via inorganic solution polymerizations from molecular precursors, generally metal alkoxides. This polymerization takes place via hydrolysis and condensation. The hydrolysis step is generally performed with a catalyst which can be an acid or base. It is a reaction between water and the precursor to generate reactive functions of hydroxy type, in the form of a solution known as a sol. Condensation converts the hydroxy functions, leading to gelling and the formation of a gel having viscosity which increases over time, to form a mineral macromolecular network. The <<gel>> phase in the sol-gel process is defined and characterized by a solid 3D <<backbone>> included in a liquid phase. The solid phase is typically a condensed polymeric sol in which the particles intermesh to form a three-dimensional network.

In one embodiment, said solutions are prepared by mixing the (co)polymer in an organic solvent, in the presence of a mineral sol-gel precursor.

The sol-gel obtained can therefore be termed a <<hybrid sol-gel>> to which organic molecules were added during synthesis and which remain in the final material.

Typically, the mineral precursor is silica functionalized with sulfonic acid ($SO_3H$—$SiO_2$).

In general, the concentration of said (co)polymer in the solution is between 5 and 20 weight %.

Sol-gel synthesis can advantageously be implemented at ambient temperature. As is conventional, it is possible to adjust the temperature, pH, type of precursor and solvent and the concentrations of the reactants.

The membrane able to be obtained with the method of the invention therefore comprises a random, 3D, continuous porous matrix of electrospun, hybrid (co)polymer fibres.

FIGURES

Figure 3:
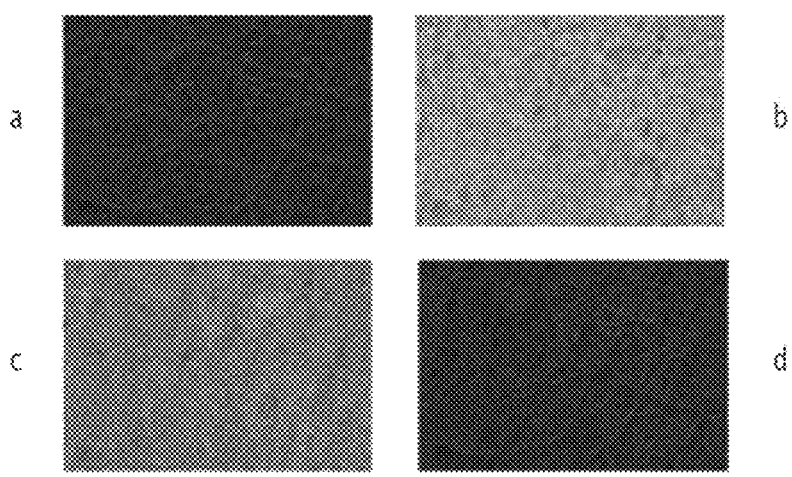

FIG. 3 gives EDX analyses showing the distribution of different elements in the fibres: oxygen (a), silicon (b), sulfur (c) and fluorine (d).

Figure 4:
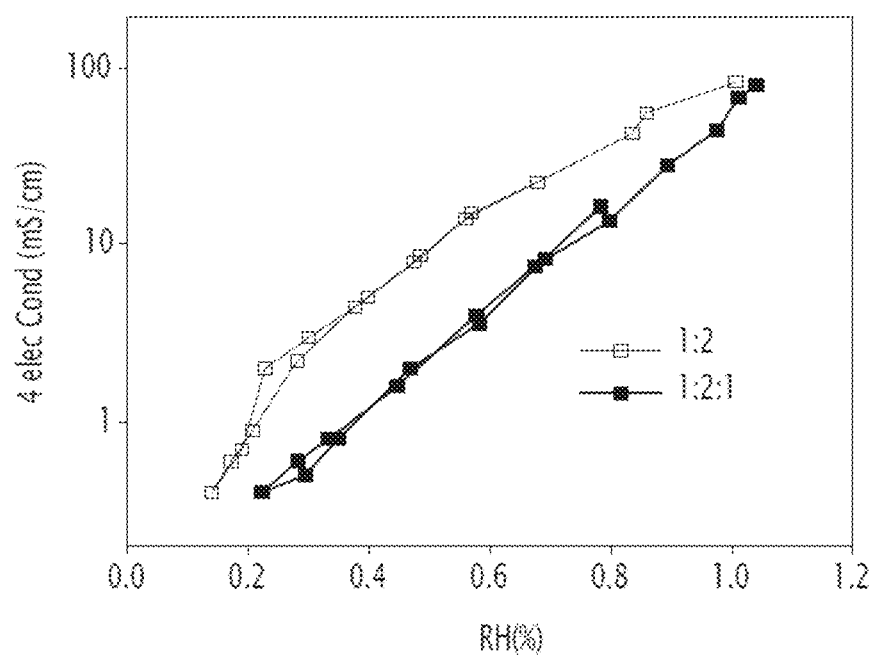

FIG. 4 illustrates the trend in proton conductivity as a function of relative humidity and the presence or absence or self-regenerating SH functions: for a hybrid electrospun membrane comprising the polymers (ii') and (iii') in a ratio of 1:2 (TEOS:CSPTC (1:2)), or comprising the polymers (i), (ii) and (iii'), in a (ii):(iii):(i) ratio of 1:2:1 (TEOS:CSPTC: MPTMS (1:2:1)).

Figure 5:
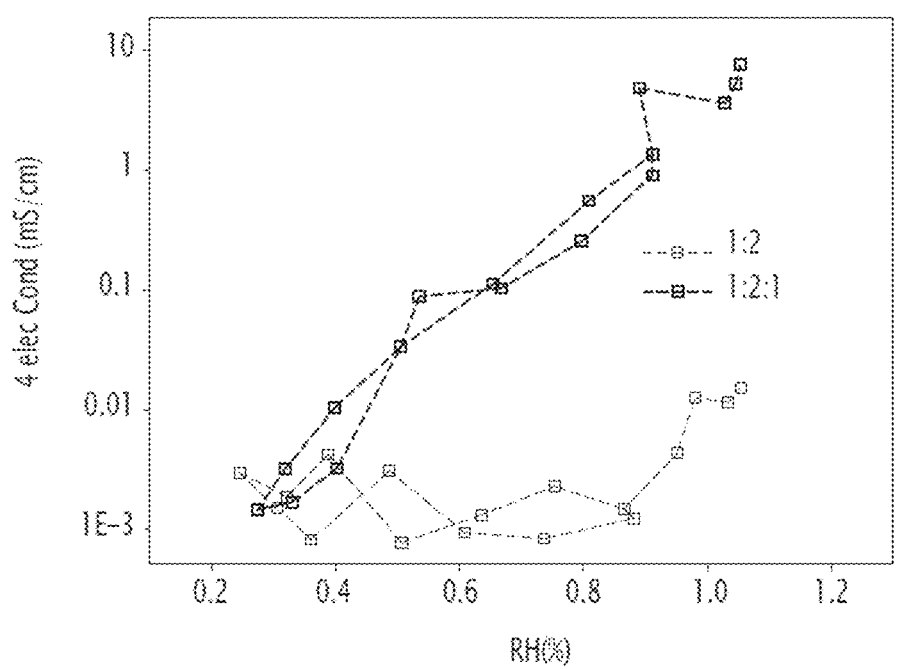

FIG. 5 illustrates the trend in proton conductivity as a function of relative humidity for a hybrid electrospun membrane after accelerated degradation tests, and as a function of the presence or absence of self-regenerating SH functions: for a membrane comprising the polymers (ii') and (iii'), in a ratio of 1:2 (TEOS:CSPTC (1:2)), or comprising the polymers (i), (ii) and (iii'), in a (ii):(iii):(i) ratio of 1:2:1 (TEOS:CSPTC:MPTMS (1:2:1)).

Figure 6:
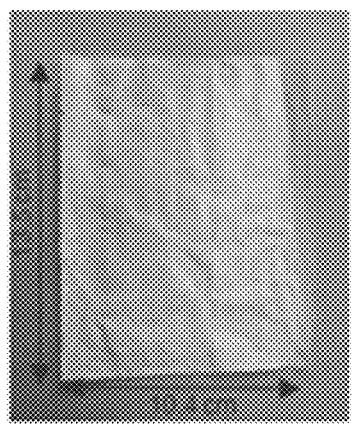
Figure 6:
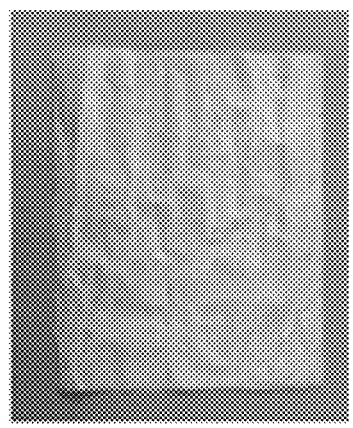

FIG. 6 is a photograph of the two surfaces of the bilayer membrane: the photo on the left shows the anode surface (conductive anodic layer) and the photo on the right shows the cathode surface (self-regenerating cathodic layer).

Figure 7:
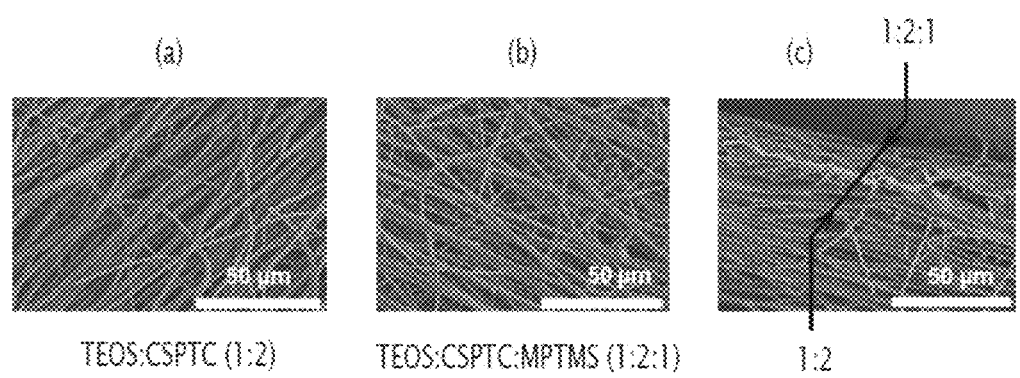

FIG. 7 gives images taken under scanning electron microscopy (SEM) showing the structure of the conductive anodic layer (a), the self-regenerating cathodic layer (b) and the cross-section of the bilayer membrane (c).

Figure 8:
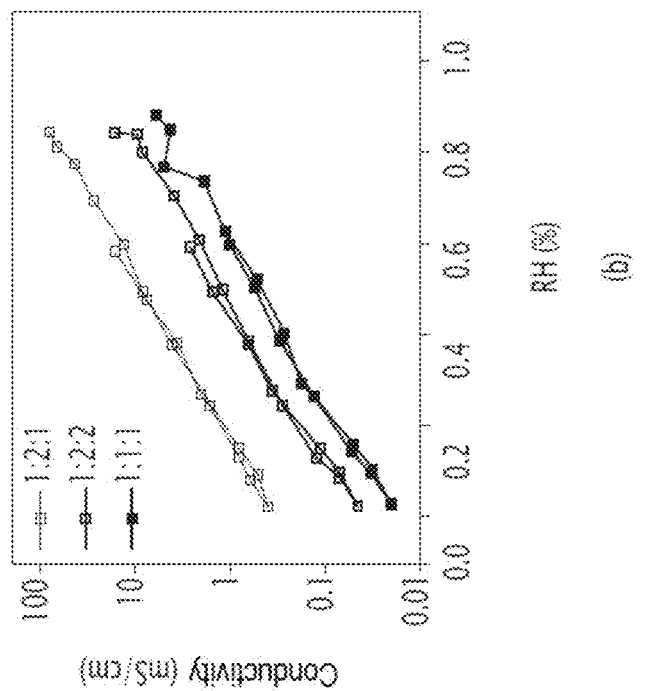
Figure 8:
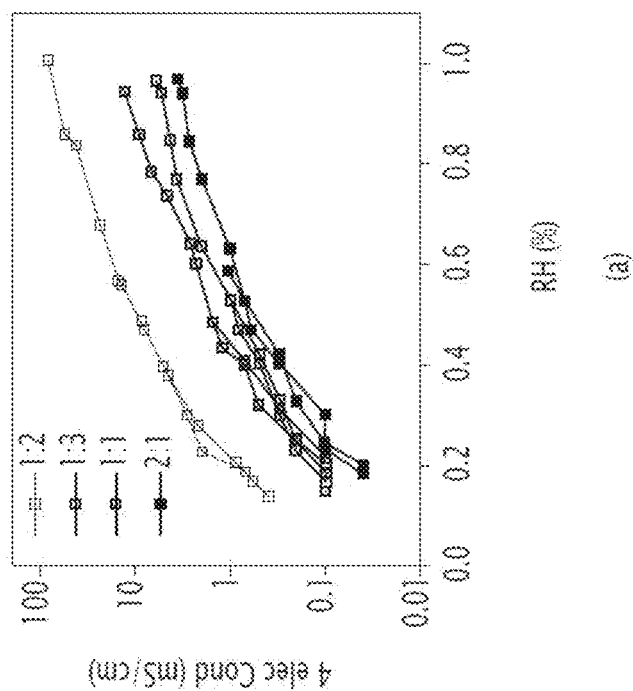

FIG. 8 illustrates the variation in conductivity as a function of relative humidity for the anodic layer (a) and the cathodic layer (b).

EXAMPLES

1. Synthesis and Characterizations

Cathodic Layer Solution:

A sol-gel solution was prepared by prior dissolution of the non-conductive polymer (PVDF-HFP) in dimethylformamide (DMF) (600 mg PVDF-HFP in 700 ml DMF). The additives (PEG: polyethylene glycol, and OFP: 2,2,3,3,4,4,5,5-octafluoro-1-pentanol) were added thereto (340 mg PEG and 60 mg OFP). The addition was then made of the silicon precursors (TEOS (tetraethylorthosilicate, 310 mg), CSPTC (2-(4-chlorosulfonylphenyl) ethyltrichlorosilane, 2.04 g from a 50 weight % solution in dichloromethane) and MPTMS ((3-Mercaptopropyl)trimethoxysilane, 310 mg), according to the different tested molar ratios, ending with CSPTC which is the most reactive. Maturation of the solution was obtained under agitation for 3 hours at 70° C., to pre-hydrolyse the silicon precursors. A homogeneous solution V2 was obtained containing the SH and —$SO_3H$ functions, and having a TEOS/CSPTC/MPTMS ratio of 1:2:1. Solutions with ratios of 1:2:2 and 1:1:1, were also prepared following this operating mode.

Anodic Layer Solution:

The above operating mode was followed from a mixture of precursors not containing MPTMS, to obtain a solution V1 (containing the —$SO_3H$ functions).

Electrospinning:

The fibres were prepared by electrospinning each of the solutions V1 and V2 obtained.

Figure 1:
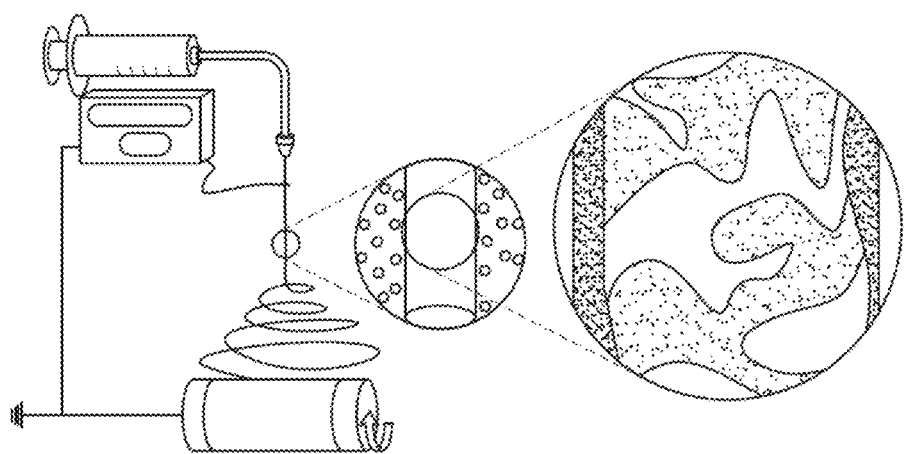
FIG. 1 illustrates the description of the electrospinning process to synthesize the constituent fibres of the membranes of the invention.
Figure 2:
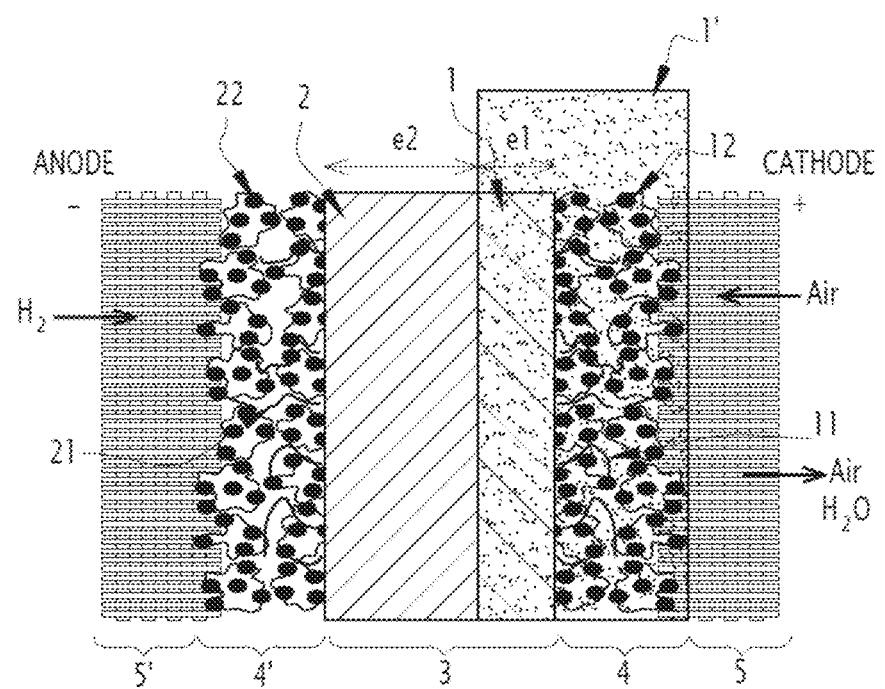
FIG. 2 illustrates the structure of a fuel cell comprising a membrane of the invention.

The electrospinning installation used (such as illustrated in FIG. 1) comprised a syringe and needle (ID=0.75 mm), ground electrode and commercial high voltage unit (ES1a, Electrospinz). The needle was connected to the high voltage unit which was able to generate positive direct current voltages of up to 40 kV.

Two syringes each containing a volume of solution V1 or solution V2 were prepared. To obtain a total thickness of 20 microns, 0.15 mL for solution V1 and 0.075 mL for solution V2 were used. Each solution V1 and V2 was electrospun at 26 kV, at a rate dependent on ambient humidity. In general, relative humidity must be lower than . . . at 60° C. and the flow rate about 0.025 mL·$min^{-1}$. The steel needle was connected to an electrode of the high voltage unit and grounded aluminium foil was placed 15 cm away from the tip of the needle to collect the different layers.

To prepare the second layer of the membrane, the first syringe was substituted by the second syringe.

A white, flexible membrane was obtained. The proton exchange membrane was finally dried in air for twenty-four hours at 70° C. After drying, the EHS separators were carefully detached from the aluminium foil. The thickness of the membrane is dependent on the volume injected into the electric field and can vary between 15 and 40 microns.

The two layers thus obtained are shown in FIG. 6.

Analyses of the Membrane

The structure was investigated under scanning electron microscopy such as illustrated in FIG. 7.

Scanning electron spectroscopy images of the surface and cross-section of the electrospun proton exchange membrane show intermeshed fibres (D=200 nm) randomly organised in the 3D space, delimiting a continuous porous matrix of 85.4%. Membrane thickness was measured to be about 20 μm. EDX analyses of the fibres (FIG. 3) show homogeneous surface distribution of the elements O, F, S and Si, not detecting any phase separation on micrometric level.

2. Properties

Calculation of water retention shows that the cathodic layer TEOS:CSPTC:MPTMS (1:2:1) is much less hydrophilic than the corresponding anodic layer TEOS:CSPTC (1:2) (69.6% water vs. 141.9% water).

The self-regenerating properties of the membranes comprising a cathodic layer having —SH functions were analysed.

Such as illustrated in FIG. 4, the trend in proton conductivity as a function of humidity shows that the addition of reactive self-regenerating functions has a low impact on conductivity values for a conventional membrane. Nevertheless, this membrane, which comprises —SH functions, displays better resistance to oxidation and in particular in the presence of $H_2O_2$ such as illustrated in FIG. 5 which shows conductivity retention after an accelerated degradation test.

The impact of the ratio of —$SO_3H$/SH functions on the physicochemical properties of the membranes was examined for different compositions:

For the anodic layer, the following TEOS:CSPTC ratios were tested:
1:2, 1:3, 1:1, and 2:1

For the cathodic layer, the following TEOS:CSPTC:MPTMS ratios were tested:
1:2:1, 1:2:2 and 1:1:1.

The impact on conductivity is illustrated in FIG. 8 which illustrates the variation in conductivity as a function of humidity rate for different compositions of hybrid membrane. The graph on the left shows the variation in conductivity as a function of the ratio TEOS/CSPTC, and the graph on the right shows the variation in conductivity as a function of the quantity of TEOS/CPSPTC/MPTMS. These experiments show that it is the TEOS:CSPTC values of 1:2 and TEOS:CSPTC:MPTMS values of 1:2:1 which afford the best results in terms of conductivity, at 80° C.

The invention claimed is:

1. A membrane assembly comprising:
   a proton exchange membrane for a fuel cell, said membrane having a cathode side and an anode side,
   a catalytic cathode layer, and
   a catalytic anode layer;
   wherein said proton exchange membrane comprises two layers comprising:
   (a) a conducting and self-regenerating cathodic layer that ensures a cathode surface on the cathode side of the membrane, wherein said cathodic layer comprises at least one polymer (iii) carrying $SO_3H$ functions, at least one polymer (ii) selected from the group consisting of a silicon derivative, a sulfonated fluorinated copolymer, and a sulfonated polyether, and at least one polymer (i) carrying thiol (—SH) functions; and (b) a conducting anodic layer that ensures an anode surface on the anode side of the membrane, said anodic layer comprising at least one polymer (iii') carrying SO$_3$H functions;

said polymers (iii) and (iii') being the same or different, wherein said polymers (i), (ii), and (iii) comprised within the cathodic layer are in a mixture or are co-polymerized;

wherein said membrane is coated with the catalytic cathodic layer on an outer surface of the cathodic layer of the membrane, and with the catalytic anodic layer on an outer surface of the anodic layer of the membrane, and wherein said cathodic layer of said membrane differs at least from the conducting anodic layer in that it comprises at least one polymer (i) carrying thiol (—SH) functions.

2. The membrane assembly according to claim 1, wherein said cathodic layer and/or said anodic layer further comprise(s) an inorganic polymer (ii) and/or (ii') respectively; said polymers (ii) and (ii') being the same or different.

3. The membrane according to claim 1, wherein the polymer (i) carrying SH functions is (3-mercaptopropyl) trimethoxysilane (MPTMS).

4. The membrane according to claim 2, wherein the polymer (ii) and/or (ii') is TEOS (tetraethyl orthosilicate) or TMOS (tetramethyl orthosilicate).

5. The membrane according to claim 1, wherein the polymer (iii) and/or (iii') is CSPTC (2-(4-Chlorosulfonylphenyl)ethyltrichlorosilane).

6. The membrane according to claim 1, wherein within said cathodic layer, the ratio of the concentration of SO$_3$H functions to the concentration of SH functions is between 0.5 and 4.

7. The membrane according to claim 1, wherein said cathodic layer has a thickness of between 3 and 15 lam.

8. The membrane according to claim 1, wherein said cathodic layer has an increasing concentration gradient of SH functions, from its inner surface with said anodic layer to its outer surface ensuring the interface with a catalytic cathodic layer.

9. The membrane according to claim 2 wherein:
in the cathodic layer, the polymers (ii), (iii) and (i) are in a ratio of 1:2:1; and
in the anodic layer the polymers (ii') and (iii') are in a ratio of 1:2.

10. A fuel cell comprising the membrane assembly according to claim 1.

11. A method for preparing the membrane assembly according to claim 1, comprising preparing the membrane;
wherein preparing the membrane comprises:
forming fibres comprising said cathodic layer, from a solution comprising at least one polymer (i) carrying thiol (—SH) functions and at least one polymer (iii) carrying SO$_3$H functions, via electrospinning;
forming fibres comprising said anodic layer, from a solution comprising at least one polymer (iii') carrying SO$_3$H functions, via electrospinning;
forming the anodic layer and the cathodic layer respectively from the fibres obtained; and
applying said cathodic layer onto said anodic layer.

12. The membrane assembly according to claim 6 wherein within said cathodic layer, the ratio of the concentration of SO$_3$H functions to the concentration of SH functions is comprised between 1 and 4.

13. The membrane assembly according to claim 7 wherein said cathodic layer has a thickness of between 5 and 10 μm.

14. The membrane assembly according to claim 7 wherein said cathodic layer has a thickness of between 5 and 7 μm.

* * * * *